US008561485B2

(12) United States Patent
Mettier et al.

(10) Patent No.: US 8,561,485 B2
(45) Date of Patent: Oct. 22, 2013

(54) HAND-HELD PIPETTING DEVICE

(75) Inventors: Ivo Mettier, Felsberg (CH); Ernst Freydl, St. Gallen (CH)

(73) Assignee: Integra Biosciences AG (CH)

( * ) Notice: Subject to any disclaimer, the term of this patent is extended or adjusted under 35 U.S.C. 154(b) by 290 days.

(21) Appl. No.: 12/764,709

(22) Filed: Apr. 21, 2010

(65) Prior Publication Data

US 2010/0263459 A1 Oct. 21, 2010

(30) Foreign Application Priority Data

Apr. 21, 2009 (CH) ........................................ 629/09

(51) Int. Cl.
*G01N 1/14* (2006.01)
*B01L 3/02* (2006.01)

(52) U.S. Cl.
USPC .................................... 73/864.11; 73/864.01

(58) Field of Classification Search
USPC ......................................... 73/864.01, 864.11
See application file for complete search history.

(56) References Cited

U.S. PATENT DOCUMENTS

| | | | | |
|---|---|---|---|---|
| 4,944,922 | A * | 7/1990 | Hayashi | 422/509 |
| 5,090,255 | A * | 2/1992 | Kenney | 73/863.02 |
| 5,271,902 | A * | 12/1993 | Sakka et al. | 422/511 |
| 5,396,512 | A * | 3/1995 | Crabb et al. | 375/257 |
| 5,736,105 | A * | 4/1998 | Astle | 422/509 |
| 5,919,706 | A | 7/1999 | Tajima | |
| 6,100,094 | A * | 8/2000 | Tajima | 436/54 |
| 6,443,022 | B1 * | 9/2002 | Gordon | 73/864.25 |
| 7,396,512 | B2 * | 7/2008 | DiTrolio et al. | 422/522 |
| 7,870,797 | B2 * | 1/2011 | Curtis et al. | 73/864.14 |
| 2005/0124059 | A1 * | 6/2005 | Kureshy et al. | 435/287.2 |
| 2005/0208676 | A1 * | 9/2005 | Kahatt | 436/180 |
| 2006/0268276 | A1 * | 11/2006 | Tajima | 356/436 |
| 2008/0192255 | A1 * | 8/2008 | Burk et al. | 356/440 |
| 2012/0033232 | A1 * | 2/2012 | Carr et al. | 356/614 |

FOREIGN PATENT DOCUMENTS

| | | |
|---|---|---|
| DE | 10 2005 049446 | 4/2007 |
| EP | 1 054 250 | 11/2000 |
| GB | 842 769 | 7/1960 |
| GB | 2 282 883 | 4/1995 |

* cited by examiner

*Primary Examiner* — Hezron E Williams
*Assistant Examiner* — Nashmiya Fayyaz
(74) *Attorney, Agent, or Firm* — Morriss O'Bryant Compagni, PC

(57) ABSTRACT

The invention relates to a hand-held pipetting device (11) with a housing (13) and a pipette receptacle (23) on the housing (13) for a replaceable pipette (24). The pipette (24) is received with its first end in the pipette receptacle (23) and has a tip (26) as a second end. Furthermore, the hand-held pipetting device (11) has a negative pressure source for aspirating a liquid, an overpressure source for dispensing an aspirated liquid, and an air line which connects the negative pressure source and overpressure source with the pipette receptacle. A valve system, which is at least partially electrically controllable, is arranged within the air line and is controlled by an aspirating button (17) provided on the housing and by an dispensing button (19). A light source (37) is provided on the housing (13) at a short distance to the longitudinal axis (31) of the pipette receptacle (23). On the light source, an optical system is provided which generates a light cone (38) from the light beams going out of the light source.

14 Claims, 5 Drawing Sheets

HAND-HELD PIPETTING DEVICE

CROSS-REFERENCE TO RELATED APPLICATION

This application claims priority to Swiss Patent Application CH00629/09 filed with the Swiss Federal Institute of Intellectual Property on Apr. 21, 2009, the entirety of which is incorporated by this reference.

BACKGROUND OF THE INVENTION

1. Field of the Invention

The invention relates generally to hand-held pipetting devices and more specifically to a hand-held pipetting device having a housing, a pipette receptacle coupled to the housing for a replaceable pipette, the replaceable pipette received with a first end in the pipette receptacle and having a tip at a second end, a negative pressure source for aspirating a liquid, an overpressure source for dispensing an aspirated liquid, an air line which connects the negative pressure source and overpressure source with the pipette receptacle, a valve system which is at least partially electrically controllable and which is arranged within the air line, an aspirating button coupled to the housing, a dispensing button and a light source.

2. State of the Art

Precise measuring of liquid volumes and transferring a precisely measured liquid volume from a first container into a second container are worldwide one of the most frequent work steps in chemical and physical laboratories. The use of so-called Peleus balls as a pipetting aid is standard in laboratories. After the Peleus ball is attached to a conventional graduated pipette, the air contained in the ball has to be ressed out by means of a ball arranged opposite to the pipette.

By actuating two further ball valves, the liquid level can be raised or lowered. A disadvantage of the Peleus ball is the possibility that liquid can accidentally be sucked into the ball thereby contaminating the same. A further disadvantage is that for operating the ball valves, the thumb and a further finger of the hand is necessary and that operating the ball valves requires a sensitive motor system.

In laboratories, also other constructions are used for safe measuring of liquids. Ergonomic and safe pipetting aids are hand-held pipetting devices into which the serological pipettes are inserted. The pipetting speed can be adjusted in an infinitely variable manner by means of a knurled screw. By pressing the upper dosing button, liquid is aspirated in a controlled manner. A lower dosing button serves for precise dispensing of the liquid, which can also be done drop-by-drop. A sterile filter arranged within the pipetting head prevents contamination. Said pipetting aids are operated with electrical power, in particular by a rechargeable battery. The operating time of such hand-held pipetting devices is limited by the relatively high power requirement of the suction device.

The withdrawal of liquid from containers demands intensive concentration, in particular in case of an optical impairment because, e.g. the containers are made of colored glass or are completely opaque. In this case, on the one hand, it is difficult to detect if the tip actually immerses into the liquid and, on the other hand, the scale on the pipette is difficult to read. In particular in deep containers with a low liquid level, the withdrawal of accurate liquid volumes is complicated and stressful. These disadvantages apply also to draining liquids from the pipette into the above described containers where, for example, contact between a container and the pipette tip is to be avoided.

From U.S. Pat. No. 5,919,706, a pipetting device is known which is equipped with a system for measuring the height of a liquid level. The system comprises a light source and a light-transmitting fiber connected to the light source, at which fiber the light exits in a focused manner in the form of a thin measuring beam. The light-transmitting fiber is arranged in the lower region of a nozzle onto which a replaceable pipette tip can be attached. For the quality of the measurement, a clear and precisely focused light signal is necessary. The lower end of the light-emitting body in the shape of a convergent lens serves for focusing the measuring beam. The outgoing light is reflected on a liquid surface and, depending on the height of the liquid level and the properties and condition of the liquid, partially absorbed therein. In contrast to the outgoing light, the reflected light has a weaker intensity. The intensity difference between the incoming and the outgoing light beam serves for generating an electrical measuring signal.

The outgoing light beam acts as a contactless measuring beam and is specifically adapted to this task. Thus, the used light is completely unsuitable to take over other tasks such as, for example, the illumination of the environment of the pipette or the pipette scale. The advantage of the described pipetting device is that the height of the liquid level is displayed to the user. A disadvantage is, however, that the pipetting device is relatively expensive to manufacture due to the additional measuring system.

The present invention avoids the described disadvantages. A hand-held pipetting device is to be provided, the handling of which requires less concentration so that, e.g., unintended suction of air, because the pipetting tip can not be seen, can be avoided. The hand-held pipetting device is to be constructed in a particularly simple and cost-effective manner. In addition, reading the measuring scale on the pipette is to be simplified. Another aim is that the power requirement of the proposed hand-held pipetting device is as low as possible.

SUMMARY OF THE INVENTION

According to the invention, a hand-held pipetting device provides a light source on the housing at a short distance to the longitudinal axis of the pipette receptacle, and that on the light source, an optical system is provided which generates a light cone of the light beams outgoing from the light source.

The hand-held pipetting device according to the invention has the advantage that the pipette tip and its vicinity is illuminated by the light cone during aspirating or dispensing. In that the light source is arranged at a short distance to the pipette receptacle, the light cone can freely illuminate the area around the pipette tip. The light source can be completely integrated in the housing. Thus, the light source does not have any projections or lugs which could get dirty or could break during the work with the hand-held pipetting device.

Unintended suction of air, which can occur in that during the suction process, the pipette tip is above the liquid surface of the liquid to be aspirated, can easily be avoided due to the very good illumination conditions. A further advantage of the light source is that the scale of the used pipette is well illuminated and readable. Thus, the precision of a pipetting process can be improved in a simple and cost-effective manner by means of the hand-held pipetting device according to the invention forms a light cone, using a divergent lens. However, other optical systems generating a light cone are also conceivable.

Since the required space of the light source is small, despite the existing light source, the hand-held pipetting device has a manageable size which does not differ from hand-held pipetting devices without light source. Also, the sequence of the pipetting process in comparison to a hand-held pipetting device without light source remains unchanged. No additional hand movements are necessary to operate the hand-held pipetting device according to the invention.

In one embodiment, the light source is a LED which emits light substantially in the visible light spectrum. LEDs are known for a good light yield at comparatively low power consumption and a very long service life. The LED ensures that the duration of the operating time of the hand-held pipetting device is affected as little as possible by the provision of the light source. Also conceivable is the use of other light sources which meet the above mentioned requirements. In most cases, LEDs have integrated optics within their housing so that the outgoing light has the shape of a cone.

Advantageously, at a distance of 300 mm from the light source, the light beams illuminate a circle diameter between 1.5 cm and 5 cm, between 2 cm and 4 cm, or between 2.5 cm and 3.5 cm. Since standard pipettes have a length of 290 mm, the circle diameter with the above dimensions lies substantially at the height of the pipette tip in the holder. The dimensions of the circle diameter at the height of the pipette tip are only achievable when light beams in the shape of a light cone are present. The circular illumination results in that the liquid surface, in which the pipette immerses, is visible under bad light conditions as this is the case, for example, in an opaque container. In addition, the working area is better illuminated than the environment. The shadow of the user or the hand-held pipetting device, which automatically occurs with a conventional ceiling lighting, is reliably compensated by means of the additional light source on the hand-held pipetting device. For the user it is possible at any time to prevent a possible loss of contact between the pipette tip and the liquid.

By the fact that the angle between the longitudinal axis of the pipette receptacle and the longitudinal axis of the light source is 0-5 degrees, 1-4 degrees, or 2-3 degrees, it is ensured that the pipette tip and its vicinity are optimally illuminated.

Advantageously, the electric circuit of the light source can be closed or interrupted by means of the aspirating button and/or the dispensing button. Thus, the light source is switched on only when the aspirating button or the dispensing button is actuated. Additional switches and operating procedures for switching on and off the light sources are not necessary. The light source is automatically switched on only when the illumination of the environment of the pipette tip during pipetting is really needed. By means of this electrical circuit, the power consumption of the light source is reduced to a minimum.

In another embodiment, within the electric circuit of the light source, a delay circuit is provided which, upon actuation of the aspirating button or the dispensing button switches the light source off after 1 to 30 seconds, 3 to 20 seconds, or after 5 to 6 seconds. The delay circuit effects a switch-off delay. The switched-on light source thus illuminates the area of the pipette tip even after completion of the pipetting process. When transferring the aspirated liquid into another container, the same is illuminated without the need of actuating the dispensing button. Also, by means of the delay circuit, an undesired contact between the pipette tip and the liquid after a completed aspirating or dispensing process, which can happen under bad light conditions, can easily be avoided.

In an embodiment variant, the light source can be activated with a separate switch. Thereby, the light source can be used according to the individual needs of the user.

Advantageously, the light source is arranged on a separate component which is detachably connectable with the housing of the hand-held pipetting device. Subsequent equipping of the hand-held pipetting device with the light source is made possible by means of this design feature.

According to a particular embodiment variant, the light source is attached to an illumination support. Since the illumination support represents a separate component, the light source can be integrated in a particular simple manner.

Due to the fact that the illumination support can advantageously be pivoted from a first position to a second position, the light source is always optimally positioned in the second position to illuminate the pipette tip, a container, and the liquid surface in the container.

On the outside of the housing, advantageously, electrical contacts are arranged which can be tapped from outside and which interact with electrical contacts arranged on the illumination support. The electrical contacts have the effect that the electrical circuit between the light source and a power source is closed only in the second position of the illumination support. Thus, unintended switching-on of the light source can reliably be prevented.

Advantageously, the light source and the pressure source or a negative pressure source, respectively, are supplied with power by means of a rechargeable battery. Thus, operating the hand-held pipetting device is independent of an external power source and is not restricted by power supply cords. Only the low power consumption of the light source allows the use of a rechargeable battery.

BRIEF DESCRIPTION OF THE DRAWINGS

The invention is described hereinafter in more detail in a schematic illustration with reference to the Figures. In the Figures.

DETAILED DESCRIPTION OF THE ILLUSTRATED EMBODIMENTS

Figure 1:
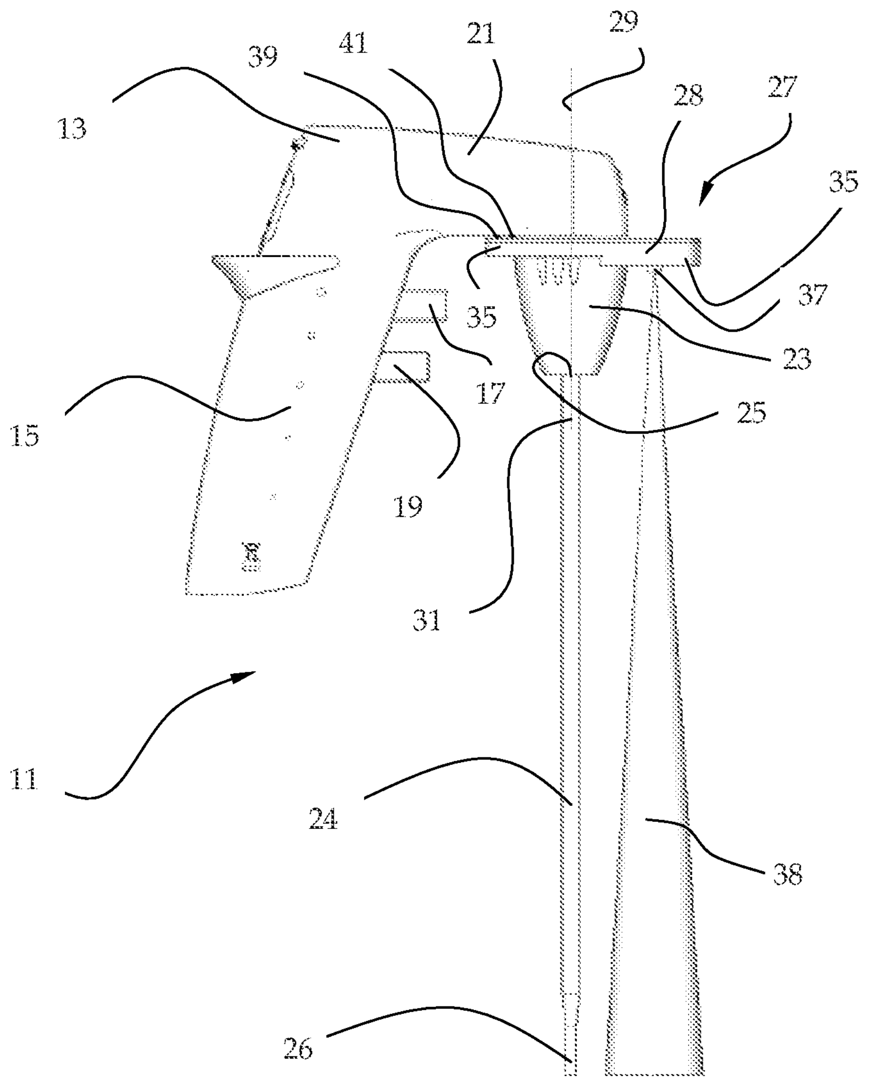
FIG. 1 shows a side view of a hand-held pipetting device with illumination support, a light source integrated in the illumination support, and a pipette received in the hand-held pipetting device.
Figure 2:
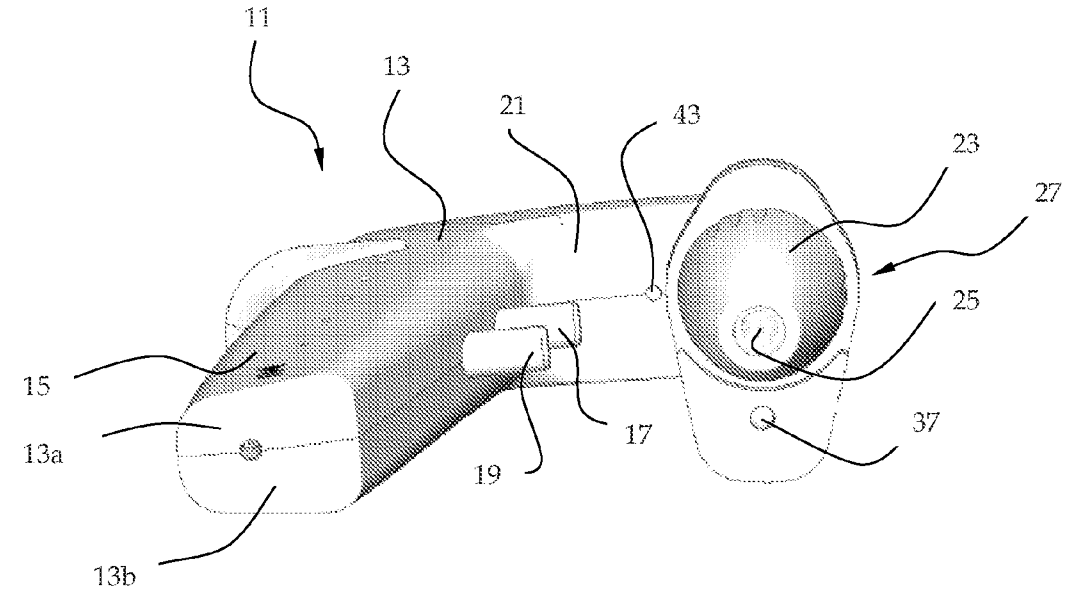
FIG. 2 shows a perspective view of the hand-held pipetting device.

FIGS. 1 and 2 show a hand-held pipetting device 11 with a L-shaped housing 13 with two legs 15, 21. The first leg of the L-shaped housing 13 serves as handle 15. In the handle 15, an aspirating button 17 and a dispensing button 19 are received. The aspirating button 17 is operated with the index finger, the dispensing button 19 is operated with the middle finger of the user. On the L-shaped housing's 13 second leg's 21 side facing away from the handle 15, a pipette receptacle 23 is arranged approximately parallel to the handle 15. The pipette receptacle 23 has a circular opening 25 in which a commercially available pipette 24 can be inserted with a first end. A second open end of the pipette 24 is formed as tip 26.

Figure 3:
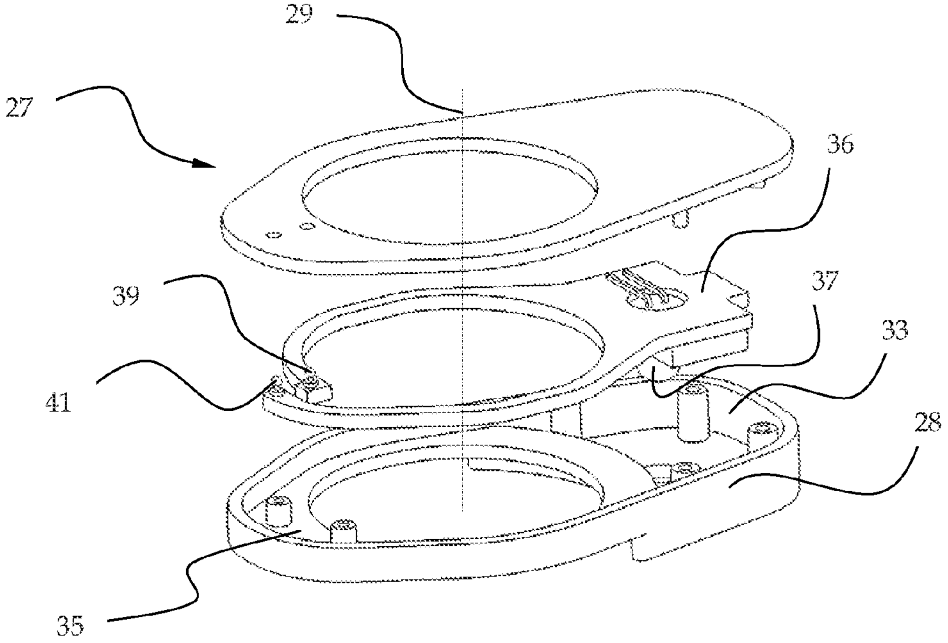
FIG. 3 shows a detailed view of the illumination support.
Figure 4:
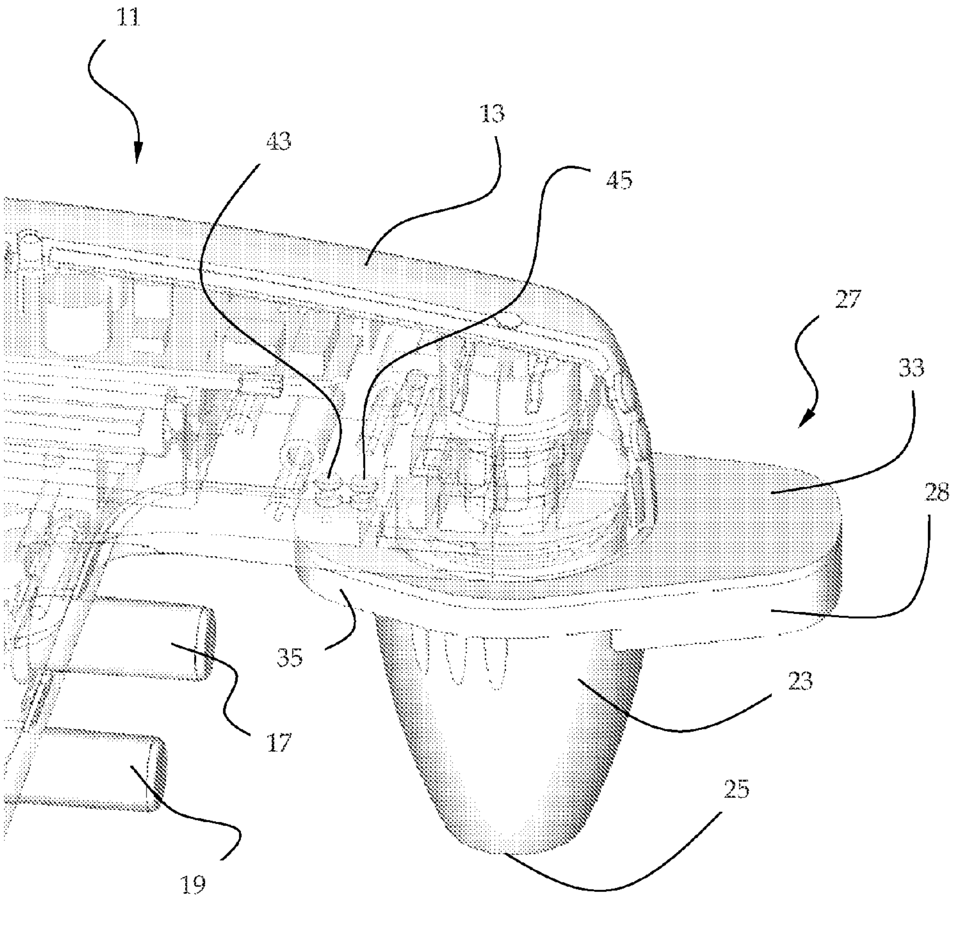
FIG. 4 shows a detailed view of the hand-held pipetting device.

Between the pipette receptacle 25 and the second leg 21, an illumination support 27 is pivotably received on the second leg 21. The illumination support 27 is pivotable between a first position and a second position. In this example, the rotational axis 29 of the illumination support 27 is equivalent to the longitudinal axis 31 of the pipette receptacle. It is also conceivable that the illumination support is fixed connected with the second leg 21 and is permanently in the first or second position FIGS. 3 and 4 show the illumination support 27 in more detail. The illumination support 27 has a housing 28, a first projection 33 and a second projection 35, which projections are opposing each other. Within the housing 28, an intermediate plate 36 is received in a positive locking manner.

Within the first projection 33, a light source 37 is positioned in such a manner that the light source 37 radiates towards the tip 26 of an attached pipette 24. The light source 37 is a light emitting diode; however, any other suitable illumination means can also be used if the power consumption is low and a sufficient light yield can be achieved for the present application. An optical system (not shown in the Figures), such as a divergent lens, is provided so that the outgoing light has the shape of a light cone 38. The light cone 38 ensures that not only the pipette tip 26, but also its surrounding area within the range of a diameter of approximately 3 cm is illuminated.

Within the second projection 35, a first and a second electrical contact 39, 41 are arranged. The electrical contacts 39, 41 are mounted on the intermediate plate 36. FIGS. 3 and 4 show that the first and the second electrical contacts 39, 41 and 43, 45, respectively, have different distances to the rotational axis 29 and are arranged on a straight line which runs through the rotational axis 29. It is also conceivable that the electrical contacts 39, 41 are arranged on a circular arc with respect to the rotational axis 29.

From FIG. 3 it is apparent that on the second leg 21, two further electrical contacts 43, 45 are attached at a short distance to the pipette receptacle in such a manner that they can be brought in alignment with the electrical contacts 39, 41 of the illumination support 27.

Figure 6:
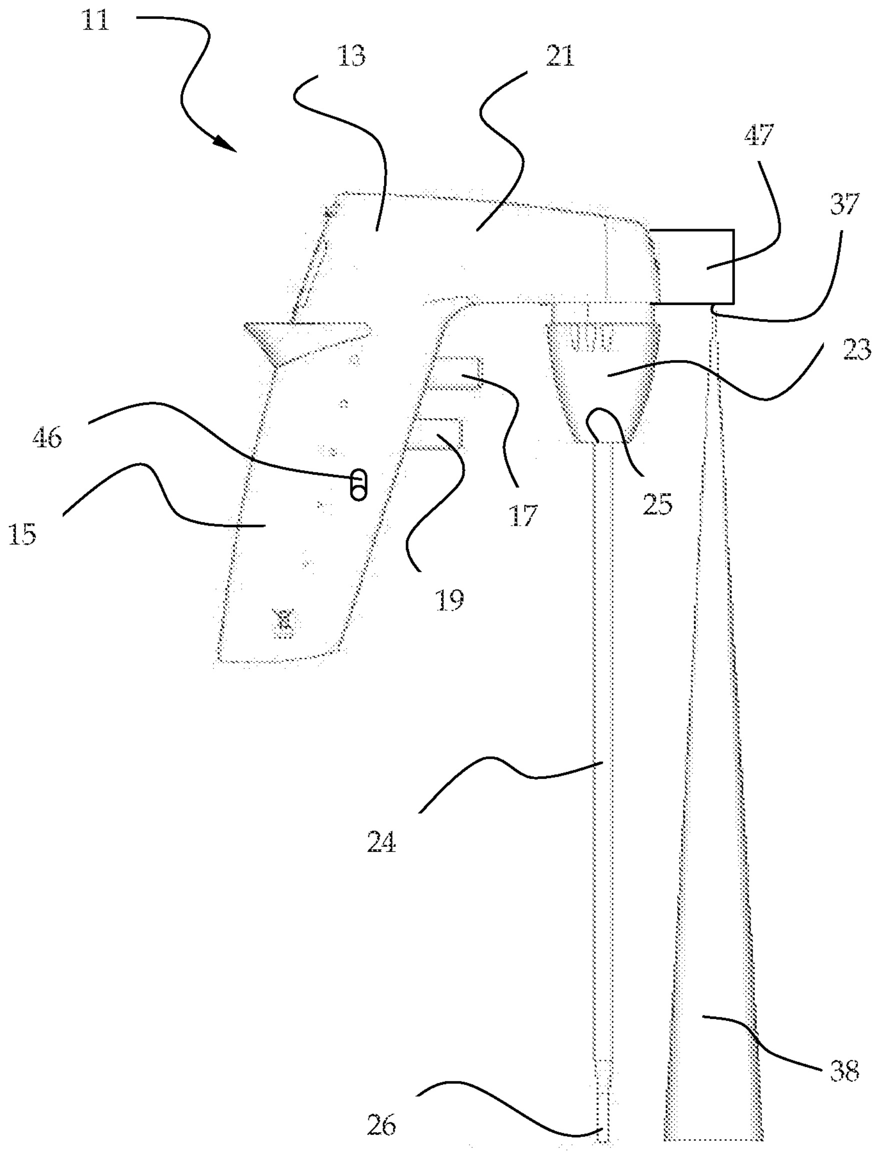
FIG. 6 shows a side view of a third embodiment variant in which the light source is integrated in a separate extension.

The power supply takes place by a central voltage source of the hand-held pipetting device 11, which power sources involves a rechargeable battery in the exemplary embodiment. It is also conceivable that the light source 37 is supplied by a separate voltage source and that the electrical circuit of the light source 37 can be closed and interrupted by a separate switch 46. The optional switch 46 is illustrated only in FIG. 6. Within the illumination support, an electronic system is integrated which is not illustrated and which adapts the existing voltage to the required voltage of the light source 37 if the supplied electrical voltage does not correspond to the required electrical voltage of the light source 37. Another task of the mentioned electronic system is that by actuating the dispensing button 19, the voltage supply of the light source is not interrupted immediately, but the light source 37 continues to emit for approximately 5 to 30 seconds.

The hand-held pipetting device 11 functions as follows. After a commercially available pipette 24 is inserted in the pipette receptacle 23, the illumination support 27 is pivoted from the first position into the second position. In the second position, the electrical contacts 39, 41 of the illumination support are brought in alignment with the electrical contacts 43, 45 of the second leg 21. Then, the pipette tip 26 is immersed into a liquid to be aspirated within a container. To avoid unintended discharge of the central power supply which is accommodated in the handle 15, the electrical circuit between power supply and light source 37 is closed only by actuating the aspirating button 17. The light source 37 is active during the aspirating process and illuminates the pipette tip 26 and the liquid surface approximately 3 cm around the pipette tip 26. Thus, the user of the hand-held pipetting device 11 can see during the entire aspirating process if the pipette tip 26 immerses into the liquid. Suction of air is easily avoidable for the user.

After actuation of the dispensing button 19 to empty the pipette 24, the light source still luminesces for approximately 5 to 30 seconds. The pipette tip 26 and the liquid jet emerging from the pipette 24 are illuminated. The user can keep the liquid jet within the desired path. Also, it is easily recognizable for the eye of the user whether the pipette tip 26 immerses into the liquid or not. The luminescence of the light source 37 effects that the user can readily identify by optical control whether the pipette tip 26, after dispensing the liquid, immerses again unintentionally into the liquid or not. The illumination source 37 therefore allows fatigue-free working which demands less concentration from the user of the hand-held pipetting device.

If the user wants to put the hand-held pipetting device 11 temporarily down, for example onto the laboratory table, he pivots the illumination support 27 from the second to the first position. The electrical circuit between the voltage source and the light source 37 is interrupted and the hand-held pipetting device 11 can be put down without the pipette tip 26 touching the depositing surface and getting contaminated.

Figure 5:
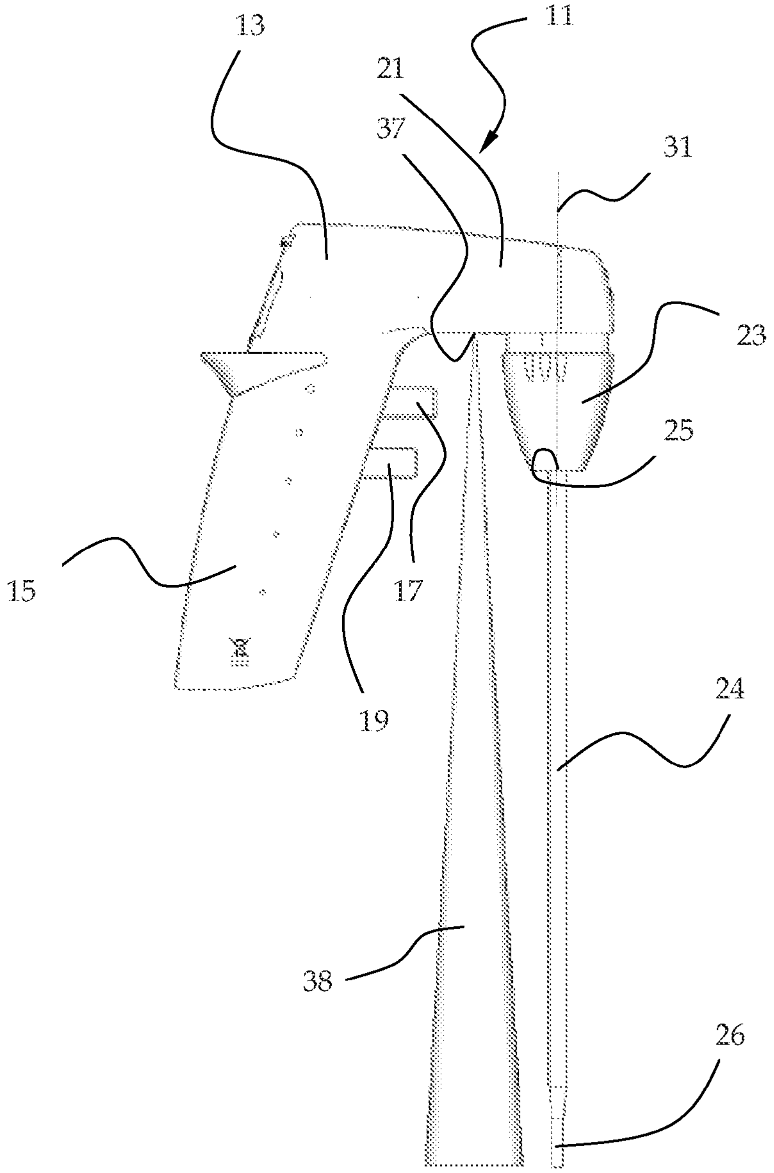
FIG. 5 shows a side view of a second embodiment variant of the hand-held pipetting device with a light source integrated in the housing.

FIG. 5 shows an embodiment variant of the hand-held pipetting device 11 in which the light source 37 is arranged within the housing at a short distance to the pipette receptacle 23. This embodiment variant has the advantage that no additional handles are necessary to operate the hand-held pipetting device 11. The light source 37 is fully integrated in the housing at the bottom side of the leg 21. Thus, the light source 37 is arranged within the housing 13 and the light beams exit the housing through a suitably dimensioned through-opening (not visible in FIG. 5). The housing is formed from two half-shells 13*a*, 13*b*, wherein on each half-shell 13*a*, 13*b*, one half of the through-opening is provided. Thereby, the half-shells can easily be ejected from the casting mold during manufacturing. The light source 37 does not form any projections or lugs which could get contaminated or could be obstructive for the user when operating the hand-held pipetting device 11. Since the light source 37 requires very little space, the dimensions of the housing remain unchanged in comparison to a hand-held pipetting device without a light source As is apparent from FIG. 6, also conceivable is an embodiment in which the light source 37 is integrated in a separate housing extension 47. The mounting of the light source 37 into the housing extension 47 can be carried out in a simple manner because there is sufficient space available in the housing extension 47. The extension can be arranged on the second leg 21 at a short distance to the pipette receptacle 23. With this arrangement of the light source 37 it is prevented that the user's fingers which operate the aspirating and dispensing buttons 17, 19 are situated within the light beams of the light source 37 and therefore generate a shadow.

In summarizing, the following can be stated:

A hand-held pipetting device 11 is additionally equipped with a light source 37. The light source 37 serves for illumination of the tip 26 of a commercially available pipette 24 which is received in a pipette receptacle 23. The light source 37 is directly integrated in the housing 13 of the hand-held pipetting device 11 and is arranged at a short distance and parallel to the longitudinal axis 31 of the pipette receptacle 23. The light source 37 is switched on by means of an aspirating button 17. When actuating a dispensing button 19, the light source 37 still luminesces for a certain time before it goes out.

The light source 23 can also be integrated in an illumination support 27. On the illumination support 27 and on the housing 13, at least two electrical contacts 39, 41, 43, 45, respectively, are attached. When the illumination support 27 is rotated sideward into a first position, the electrical contacts of the housing 43, 45 and the electrical contacts of the illumination support 39, 41 are separated from each other. When the illumination support 27 is in a second position, the electrical circuit between the voltage source within the hand-held pipetting device 11 and the light source 23 is closed and the contacts 39, 41 are connected with the contacts 43, 45. The illumination support 27 is detachable and can be reattached to the hand-held pipetting device 11.

Another possibility of mounting the light source 37 is that the light source 37 is received in a housing extension 47.

The invention claimed is:

1. A hand-held pipetting device, comprising a housing, a pipette receptacle coupled to the housing for a replaceable pipette, the replaceable pipette received with a first end in the pipette receptacle and having a tip at a second end, a negative pressure source for aspirating a liquid, an overpressure source for dispensing an aspirated liquid, an air line which connects the negative pressure source and overpressure source with the pipette receptacle, a valve system which is at least partially electrically controllable and which is arranged within the air line, an aspirating button coupled to the housing, a dispensing button, a light source coupled by an illumination support to the housing at a relatively short distance to a longitudinal axis of the pipette receptacle, an optical system coupled to the light source which generates a light cone from light emanating from the light source, the light cone illuminating the tip of the replaceable pipette and an area proximate the tip of the replaceable pipette and having a longitudinal axis that is substantially parallel to a longitudinal axis of the pipette receptacle, and first electrical contacts on an outside of the housing which can be tapped from outside and which interact with second electrical contacts arranged on the illumination support, a connection between the first electrical contacts and the second electrical contacts interrupted when the illumination support is in a first position, and closed when the illumination support is in a second position.

2. The hand-held pipetting device according to claim 1, wherein the light source is an LED which emits light substantially in the visible light spectrum.

3. The hand-held pipetting device according to claim 1, wherein at a distance of approximately 300 mm from the light source, the light illuminates a circle diameter between about 1.5 cm and 5 cm.

4. The hand-held pipetting device according to claim 1, wherein an angle between the longitudinal axis of the pipette receptacle and a longitudinal axis of the light source is about 0-5 degrees.

5. The hand-held pipetting device according to claim 1, wherein an electrical circuit of the light source can be closed and interrupted by at least one of the aspirating button and the dispensing button.

6. The hand-held pipetting device according to claim 5, wherein in the electrical circuit of the light source, a delay circuit is provided which, upon actuation of the aspirating button or the dispensing button, switches the light source off after about 1 to 30 seconds.

7. The hand-held pipetting device according to claim 1, wherein the light source can be activated with a separate switch.

8. The hand-held pipetting device according to claim 1, wherein the illumination support comprises a separate component which is detachably connectable with the housing.

9. The hand-held pipetting device according to claim 1, wherein the illumination support is pivotable from a first position to a second position.

10. The hand-held pipetting device according to claim 1, wherein the light source and at least one of the overpressure source and negative pressure source are supplied with current by a rechargeable battery.

11. The hand-held pipetting device according to claim 1, wherein at a distance of approximately 300 mm from the light source, the light illuminates a circle diameter between about 2 cm and 4 cm.

12. The hand-held pipetting device according to claim 1, wherein an angle between the longitudinal axis of the pipette receptacle and a longitudinal axis of the light source is about 1 to 4 degrees.

13. The hand-held pipetting device according to claim 1, wherein at a distance of approximately 300 mm from the light source, the light illuminates a circle diameter between about 2.5 cm and 3.5 cm.

14. The hand-held pipetting device according to claim 1, wherein an angle between the longitudinal axis of the pipette receptacle and a longitudinal axis of the light source is about 2 to 3 degrees.

* * * * *